(12) United States Patent
Tanaka

(10) Patent No.: US 10,331,070 B2
(45) Date of Patent: Jun. 25, 2019

(54) IMAGE FORMING APPARATUS HAVING SENSOR FOR DETECTING NON-IMAGE TONER

(71) Applicant: KYOCERA Document Solutions Inc., Osaka (JP)

(72) Inventor: Hiroki Tanaka, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/011,088

(22) Filed: Jun. 18, 2018

(65) Prior Publication Data

US 2018/0373176 A1 Dec. 27, 2018

(30) Foreign Application Priority Data

Jun. 27, 2017 (JP) .................................. 2017-124748

(51) Int. Cl.
*G03G 15/00* (2006.01)
*G03G 15/01* (2006.01)
*H04N 1/028* (2006.01)

(52) U.S. Cl.
CPC ....... *G03G 15/556* (2013.01); *G03G 15/0189* (2013.01); *G03G 15/5054* (2013.01); *H04N 1/02815* (2013.01); *G03G 2215/00059* (2013.01)

(58) Field of Classification Search
CPC .............. G03G 15/556; G03G 15/5041; G03G 15/5054; G03G 2215/00042; G03G 2215/0005; G03G 2215/00059
USPC .................................................. 399/49, 302
See application file for complete search history.

(56) References Cited

U.S. PATENT DOCUMENTS

| | | | | | |
|---|---|---|---|---|---|
| 5,398,099 | A | * | 3/1995 | Nagamochi | G03G 15/04 399/171 |
| 6,144,811 | A | * | 11/2000 | Ohori | G03G 15/70 399/21 |
| 2007/0104501 | A1 | * | 5/2007 | Sako | G03G 15/5037 399/49 |
| 2008/0267640 | A1 | * | 10/2008 | Hamaya | G03G 15/5041 399/26 |

FOREIGN PATENT DOCUMENTS

JP 63137245 A * 6/1988
JP 2008-070796 3/2008

* cited by examiner

*Primary Examiner* — Robert B Beatty

(57) ABSTRACT

An exposure device forms an electrostatic latent image on a photoconductor drum. A charging device charges the photoconductor drum with a charging bias. A development roller holds toner with a development bias and attaches the toner to the electrostatic latent image. A toner image is obtained by attaching the toner to the electrostatic latent image and primarily transferred onto an intermediate transfer member. A determining unit primarily transfers to the intermediate transfer member non-image toner attached on the photoconductor drum while the charging bias and the development bias are increased before image forming and/or while the charging bias and the development bias are decreased after image forming, and determines an amount of the non-image toner on the basis of an output of a sensor. A managing unit determines a toner consumption amount or a toner residual amount with taking the determined amount of the non-image toner into account.

3 Claims, 5 Drawing Sheets

IMAGE FORMING APPARATUS HAVING SENSOR FOR DETECTING NON-IMAGE TONER

CROSS-REFERENCE TO RELATED APPLICATIONS

This application relates to and claims priority rights from Japanese Patent Application No. 2017-124748, filed on Jun. 27, 2017, the entire disclosures of which are hereby incorporated by reference herein.

BACKGROUND

1. Field of the Present Disclosure

The present disclosure relates to an image forming apparatus.

2. Description of the Related Art

In an electrophotographic image forming apparatus, toner fog may occur in a non-image area of a photoconductor drum. An image forming apparatus detects a density of a test pattern using a density sensor, sets a fogging toner consumption amount per rotation corresponding to the detected density, and calculates a toner consumption amount including the fogging toner consumption amount.

However, in the aforementioned image forming apparatus, the toner consumption amount due to toner fog is derived from the density of the test pattern, and therefore, an amount of toner actually attached on the non-image area is not measured, and consequently, the toner consumption amount due to toner fog is not properly determined.

FIG. 5 shows a timingchart that explains a behavior of an image forming apparatus in an image forming process. As shown in FIG. 5, an electrophotographic image forming apparatus starts rotation of a photoconductor drum before starting an image forming action (at the time T1), and gradually increases a charging bias and thereby charges the photoconductor drum so as to gradually increase a surface potential of the photoconductor drum to a predetermined value (from the time T1 to the time T3), and therewith gradually increases a development bias to a predetermined value. The development bias is increased from a time point (the time T2) when a time td1 elapses from starting the increase of the charging bias (the time T1). The time td1 is obtained by dividing an arrangement angle difference between a charging device and a development roller (specifically, an angle from a contact position between the charging device and the photoconductor drum to a position with the shortest distance between the development roller and the photoconductor drum when a center shaft of the photoconductor drum is considered as the center) by a rotation speed of the photoconductor drum. Afterward, after the photoconductor drum rotates by predetermined times and the surface potential of the photoconductor drum gets stable, exposure is performed for image forming on the basis of image data (the time T4 to the time T6) and therewith a primary transfer bias (positive bias) is applied with a delay of a time td2 (from the time T5 to the time T7). The time td2 is obtained by dividing an angle difference between an exposure device and the primary transfer position (specifically, an angle from the exposure device to a position with the shortest distance between a primary transfer roller and the photoconductor drum when a center shaft of the photoconductor drum is considered as the center) by a rotation speed of the photoconductor drum. Consequently, toner is attached to an electrostatic latent image formed by the exposure and thereby a toner image is formed, and thereafter the toner image is primarily transferred to an intermediate transfer belt. Afterward, until the toner image is secondarily transferred, the intermediate transfer belt and the photoconductor drum continues to be driven, and when the secondary transfer is finished, driving the intermediate transfer belt and the photoconductor drum is finished.

Further, the electrophotographic image forming apparatus gradually decreases the charging bias after finishing the image forming action (until the time T8) and thereby discharges the photoconductor drum so as to decrease the surface potential of the photoconductor drum, and gradually decreases the development bias to zero volt (until the time T9).

As mentioned, when the charging bias and the development bias are controlled before staring the image forming action and after finishing the image forming, the charging bias and the development bias are gradually changed so as to restrain toner fog on a non-image area.

In addition, when using two-component developer, it is required not only to restrain toner fog but to avoid carrier development (i.e. attachment of carrier from a development device to a photoconductor drum). Therefore, although the surface potential of the photoconductor drum is increased to restrain toner fog on a non-image area, it is required to maintain a difference between the surface potential of the photoconductor drum and the development bias so that the carrier does not jump for avoiding carrier development.

It is possible to directly measure the surface potential of the photoconductor drum and control the charging bias on a feedback basis, but a large device cost is required due to a measurement sensor for the surface potential, and therefore it is not practical. Consequently, the surface potential of the photoconductor drum is usually controlled on a feedforward basis by adequately tuning up the charging bias.

However, a relationship between the charging bias and the surface potential of the photoconductor drum is non linear, and in addition, changes in accordance with temperature fluctuation, aging of surface film thickness and surface condition or the like. Therefore, as mentioned, even though the charging bias and the development bias are changed before staring the image forming action or after finishing the image forming, toner fog may occur on a non-image area.

Thus, since a cause of toner fog complexly varies, in the aforementioned image forming apparatus, a toner consumption amount due to toner fog that actually occurred is not properly determined.

SUMMARY

An image forming apparatus according to an aspect of the present disclosure includes a photoconductor drum, an exposure device, a charging device, a development roller, an intermediate transfer member, a sensor, a determining unit, and a managing unit. The exposure device is configured to irradiate the photoconductor drum with light and thereby form an electrostatic latent image. The charging device is configured to charge the photoconductor drum with a charging bias. The development roller is configured to hold toner with a development bias and attach the toner to the electrostatic latent image. Onto the intermediate transfer member, a toner image is primarily transferred, and the toner image is obtained by attaching the toner to the electrostatic latent image. The sensor is configured to detect the toner on the intermediate transfer member. The determining unit is configured to primarily transfer to the intermediate transfer member non-image toner attached on the photoconductor drum while the charging bias and the development bias are increased before image forming and/or while the charging bias and the development bias are decreased after image forming, and determine an amount of the non-image toner on the basis of an output of the sensor. The managing unit is configured to determine a toner consumption amount or a toner residual amount with taking the determined amount of the non-image toner into account.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
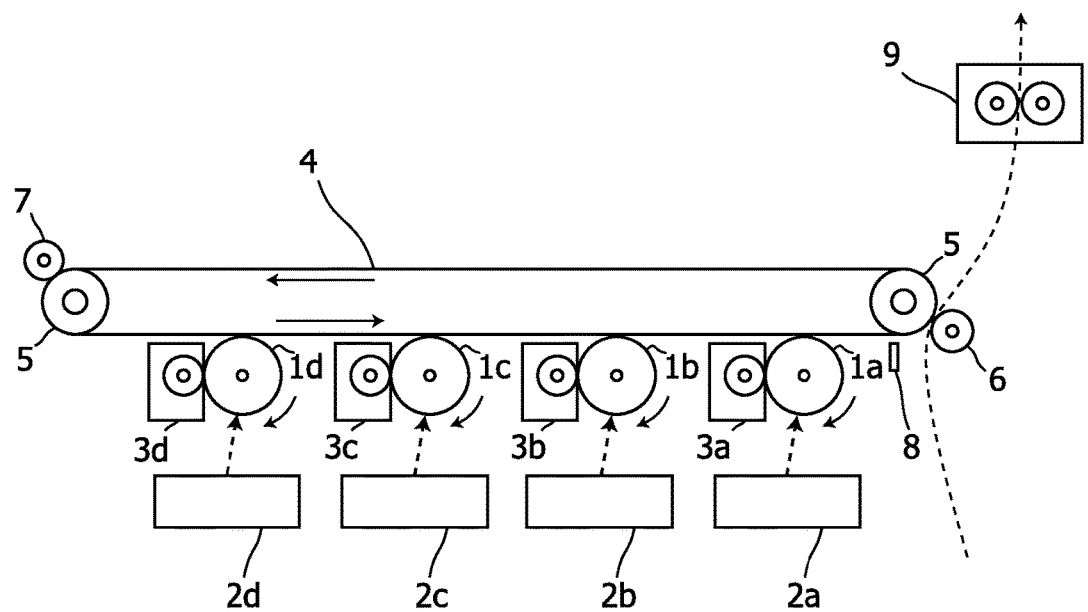
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus shown in FIG. 1 is an apparatus including an electrophotographic printing function, such as a printer, a facsimile machine, a copier, or a multi function peripheral.

The image forming apparatus in this embodiment includes a tandem-type color development device. This color development device includes photoconductor drums 1a to 1d, exposure devices 2a to 2d, and development devices 3a to 3d for respective colors. The photoconductor drums 1a to 1d are photoconductors of four colors: Cyan, Magenta, Yellow and Black. The exposure devices 2a to 2d are devices that form electrostatic latent images by irradiating the photoconductor drums 1a to 1d with laser light. Each of the exposure devices 2a to 2d includes a laser diode as a light source of the laser light, optical elements (such as lens, mirror and polygon mirror) that guide the laser light to the photoconductor drum 1a, 1b, 1c, or 1d, and irradiates the photoconductor drum 1a, 1b, 1c, or 1d with the laser light and thereby forms an electrostatic latent image on the photoconductor drum 1a, 1b, 1c, or 1d.

Toner containers are attached to the development devices 3a to 3d, and the toner containers are filled up with toner of four colors: Cyan, Magenta, Yellow and Black, respectively. Development biases are applied to the development devices 3a to 3d, respectively, and thereby on the basis of differences between potentials of the development devices 3a to 3d and the photoconductor drums 1a to 1d, the development devices 3a to 3d cause the toner supplied from the toner containers to adhere to electrostatic latent images on the photoconductor drums 1a to 1d, respectively, and consequently form toner images of the four colors.

In this embodiment, two-component developer is used and in the development device 3a, 3b, 3c, or 3d, toner is agitated with carrier.

The photoconductor drum 1a, the exposure device 2a and the development device 3a perform development of Magenta. The photoconductor drum 1b, the exposure device 2b and the development device 3b perform development of Cyan. The photoconductor drum 1c, the exposure device 2c and the development device 3c perform development of Yellow. The photoconductor drum 1d, the exposure device 2d and the development device 3d perform development of Black.

Figure 2:
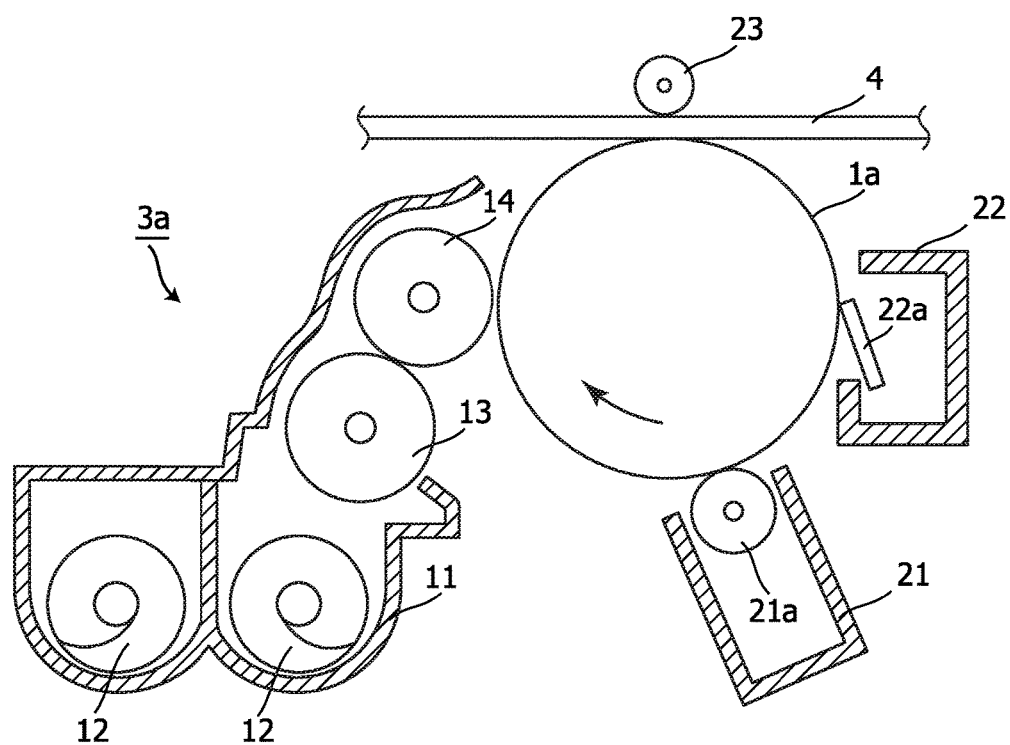
FIG. 2 shows a diagram that indicates sorts of devices around the photoconductor drum 1a shown in FIG. 1.

FIG. 2 shows a diagram that indicates sorts of devices around the photoconductor drum 1a shown in FIG. 1. In FIG. 2, sorts of devices around the photoconductor drum 1a are depicted, and devices around the photoconductor drum 1b, 1c, or 1d have the same configuration.

As shown in FIG. 2, not only the development device 3a but a charging device 21 and a cleaning device 22 are arranged in the periphery of the photoconductor drum 1a. The charging device 21 charges the photoconductor drum 1a with a specified charging bias. In this embodiment, the charging device 21 includes a charging roller 21a that contacts to the photoconductor drum 1a and charges the photoconductor drum 1a using the charging roller 21a. The cleaning device 22 includes a cleaning blade 22a that contacts to the photoconductor drum 1a and collects residual toner on the photoconductor drum 1a. Further, a primary transfer roller 23 is arranged at a position opposite to the photoconductor drum 1a across an intermediate transfer belt 4.

The development device 3a includes a housing 11, agitation screws 12, a magnetic roller 13, and a development roller 14.

An unshown toner container is connected to the development device 3a, and toner is supplied from the toner container via an unshown supply port into the housing 11. In the housing 11, the agitation screws 12 agitate two-component developer composed by the toner and carrier. As the carrier, a magnetic material is used.

The magnetic roller 13 keeps the two-component developer forming a brush shape on a surface thereof. The toner in the two-component developer is transferred to the development roller 14 in accordance with a transportation bias that is a voltage between the magnetic roller 13 and the development roller 14.

The development roller 14 keeps the toner transferred from the magnetic roller 13 as a thin toner layer on a surface thereof. A development bias is applied to the development roller 14, and thereby the toner layer formed on the surface of the development roller 14 is transferred to the photoconductor drum 1a by a potential of the photoconductor drum 1a from the development roller 14 (i.e. a difference between the development bias and the surface potential of the photoconductor drum 1a). Thus, the development roller 14 supplies the toner to an electrostatic latent image on the photoconductor drum 1a.

As mentioned, the development roller 14 holds the toner with a development bias and attaches the toner to the electrostatic latent image.

Returning to FIG. 1, the intermediate transfer belt 4 is an image carrier that carries a toner image transferred from the photoconductor drums 1a to 1d, and is an endless (i.e. loop-shaped) intermediate transfer member. The intermediate transfer belt 4 is hitched around driving rollers 5, and rotates by driving force of the driving rollers 5 towards the direction from the contact position with the photoconductor drum 1d to the contact position with the photoconductor drum 1a.

Thus, a toner image is obtained by attaching the toner to the electrostatic latent image, and primarily transferred onto the intermediate transfer belt 4.

A secondary transfer roller 6 contacts an incoming paper sheet to the intermediate transfer belt 4, and secondarily transfers the toner image on the intermediate transfer belt 4 to the paper sheet. The paper sheet on which the toner image has been transferred is transported to a fuser 9, and consequently, the toner image is fixed on the paper sheet.

A roller 7 includes a cleaning brush, and contacts the cleaning brush to the intermediate transfer belt 4 and thereby removes residual toner on the intermediate transfer belt 4 after the secondary transfer of the toner image to the paper sheet. Instead of the roller 7 including a cleaning brush, a cleaning blade may be used.

A sensor 8 is a reflection-type optical sensor that detects toner on the intermediate transfer belt 4, and irradiates the intermediate transfer belt 4 with light and detects its reflection light in order to measure a toner density in a calibration process or the like. Specifically, in the calibration process, the sensor 8 irradiates with light a predetermined area where a test toner pattern formed on the intermediate transfer belt 4 passes, detects its reflection light, and outputs an electrical signal corresponding to the detected intensity of the reflection light. The sensor 8 is also used for density detection of non-image toner as mentioned below.

Figure 3:
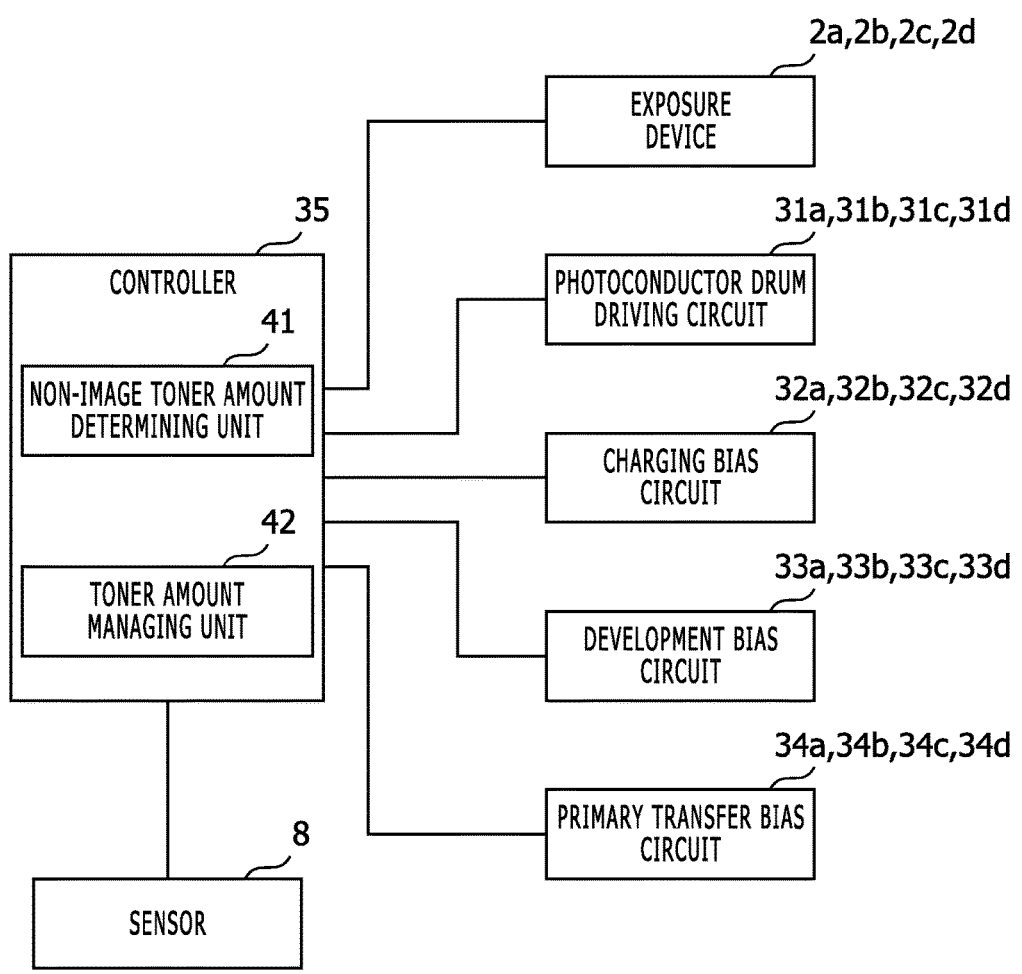
FIG. 3 shows a block diagram that indicates an electronic configuration of the image forming apparatus in the embodiment according to the present disclosure.

FIG. 3 shows a block diagram that indicates an electronic configuration of the image forming apparatus in the embodiment according to the present disclosure.

Photoconductor drum driving circuits 31a, 31b, 31c and 31d drive the photoconductor drums 1a, 1b, 1c and 1d in accordance with a control signal provided from a controller 35, respectively.

Charging bias circuits 32a, 32b, 32c and 32d apply charging biases to charging devices corresponding to the photoconductor drums 1a, 1b, 1c and 1d in accordance with a control signal provided from the controller 35, respectively. For example, the charging bias circuit 32a applies a charging bias to the charging roller 21a of the charging device 21 corresponding to the photoconductor drum 1a.

Development bias circuits 33a, 33b, 33c and 33d apply development biases to development rollers of the development devices 3a, 3b, 3c and 3d, respectively. For example, the development bias circuit 33a applies a development bias to the development roller 14 of the development device 3a.

Primary transfer bias circuits 34a, 34b, 34c and 34d apply primary transfer biases between the photoconductor drums 1a to 1d and the intermediate transfer belt 4, respectively. For example, in order to apply the primary transfer bias for the photoconductor drum 1a, a predetermined potential is set to the primary transfer roller 23.

The controller 35 controls the photoconductor drum driving circuits 31a to 31d, the charging bias circuits 32a to 32d, the development bias circuits 33a to 33d, the primary transfer bias circuits 34a to 34d, the exposure devices 2a to 2d and the like, and thereby performs development, transfer and fixation of a toner image, paper sheet feeding, printing, and paper sheet outputting.

Specifically, the controller 35 controls turning on/off of rotation of the photoconductor drums 1a to 1d and controls rotation speeds of the photoconductor drums 1a to 1d using the photoconductor drum driving circuits 31a to 31d. Further, the controller 35 controls charging biases of the charging devices 21 corresponding to the photoconductor drums 1a to 1d using the charging bias circuits 32a to 32d. Furthermore, the controller 35 controls development biases of the development devices 3a to 3d using the development bias circuits 33a to 33d. Furthermore, the controller 35 controls primary transfer biases (i.e. voltages of the primary transfer rollers 23) corresponding to the photoconductor drums 1a to 1d using the primary transfer bias circuits 34a to 34d.

The controller 35 is a processing circuit that for example, includes a computer that acts in accordance with a control program, an ASIC (Application Specific Integrated Circuit) and/or the like. Here the controller 35 acts as a non-image toner amount determining unit (an example of the determining unit) 41, and a toner amount managing unit (an example of the managing unit) 42.

The non-image toner amount determining unit 41 (a) primarily transfers to the intermediate transfer belt 4 non-image toner (i.e. toner attached on a non-image area due to toner fog) attached on the photoconductor drum 1a, 1b, 1c, or 1d while the charging bias and the development bias are increased before image forming and/or while the charging bias and the development bias are decreased after image forming, and (b) determines an amount of the non-image toner on the basis of an output of the sensor 8.

For example, the non-image toner amount determining unit 41 determines the amount of the non-image toner on the basis of (a) a density and (b) a length in a secondary scanning direction of the non-image toner detected by the sensor 8. Specifically, for example, the amount of the non-image toner may be a product of: (a) the density of the detected non-image toner, (b) the length in a secondary scanning direction of the detected non-image toner, and (c) a predetermined coefficient (constant).

Here the density of the non-image toner is determined on the basis of an output voltage level of the sensor 8. For example, in the same manner as the calibration, the density of the non-image toner is determined in accordance with a predetermined calculation formula based on a difference between an output voltage level of the sensor 8 for a surface material of the intermediate transfer belt 4 and an output voltage level for the non-image toner on the intermediate transfer belt 4. In addition, the length of the non-image toner is determined as a product of: (a) a time length when the non-image toner is detected in an output signal of the sensor 8 and (b) a known linear velocity of the intermediate transfer belt 4.

On the basis of a predetermined condition (e.g. the number of printing times, the number of printed paper sheets, elapsed time or the like from a previous action of the primary transfer of the non-image toner and the determination of the non-image toner amount), the non-image toner amount determining unit 41 determines whether the primary transfer of the non-image toner and the determination of the non-image toner amount should be performed or not. If the predetermined condition is satisfied, then the non-image toner amount determining unit 41 performs the primary transfer of the non-image toner and the determination of the non-image toner amount; contrarily, if the predetermined condition is not satisfied, then the non-image toner amount determining unit 41 does not perform the primary transfer of the non-image toner and the determination of the non-image toner amount.

The toner amount managing unit 42 determines a toner consumption amount or a toner residual amount with taking into account the non-image toner amount determined by the non-image toner amount determining unit 41. For example, the toner amount managing unit 42 (a) determines a toner usage amount of an image area on the basis of a pixel value of image data, the number of dots in a half-toning image and/or the like, (b) determines a sum of: (b1) the toner usage amount of the image area and (b2) the non-image toner amount as the toner consumption amount, and (c) determines the toner residual amount by subtracting the toner consumption amount from a predetermined value (i.e. a toner amount of a new toner container).

In this embodiment, the non-image toner amount determining unit 41 determines a total amount of the non-image toner on the basis of (a) the determined amount of the non-image toner and (b) the number of times of (b1) increase of the charging bias and the development bias before image forming and/or (b2) decrease of the charging bias and the development bias before image forming; and the toner amount managing unit 42 determines a toner consumption amount or a toner residual amount with taking the determined total amount into account.

For example, the total amount of the non-image toner is determined as a sum of: (a) a product of (a1) the non-image toner amount in increase of the charging bias and the development bias before image forming and (a2) the number of times of increase of the charging bias and the development bias before image forming and (b) a product of (b1) the non-image toner amount in decrease of the charging bias and the development bias after image forming and (b2) the number of times of decrease of the charging bias and the development bias after image forming. Subsequently, a sum of: (a) the toner usage amount of the image area and (b) the total amount of the non-image toner is determined as the toner consumption amount, and the toner residual amount is determined by subtracting the toner consumption amount from a predetermined value (i.e. a toner amount of a new toner container).

Figure 4:
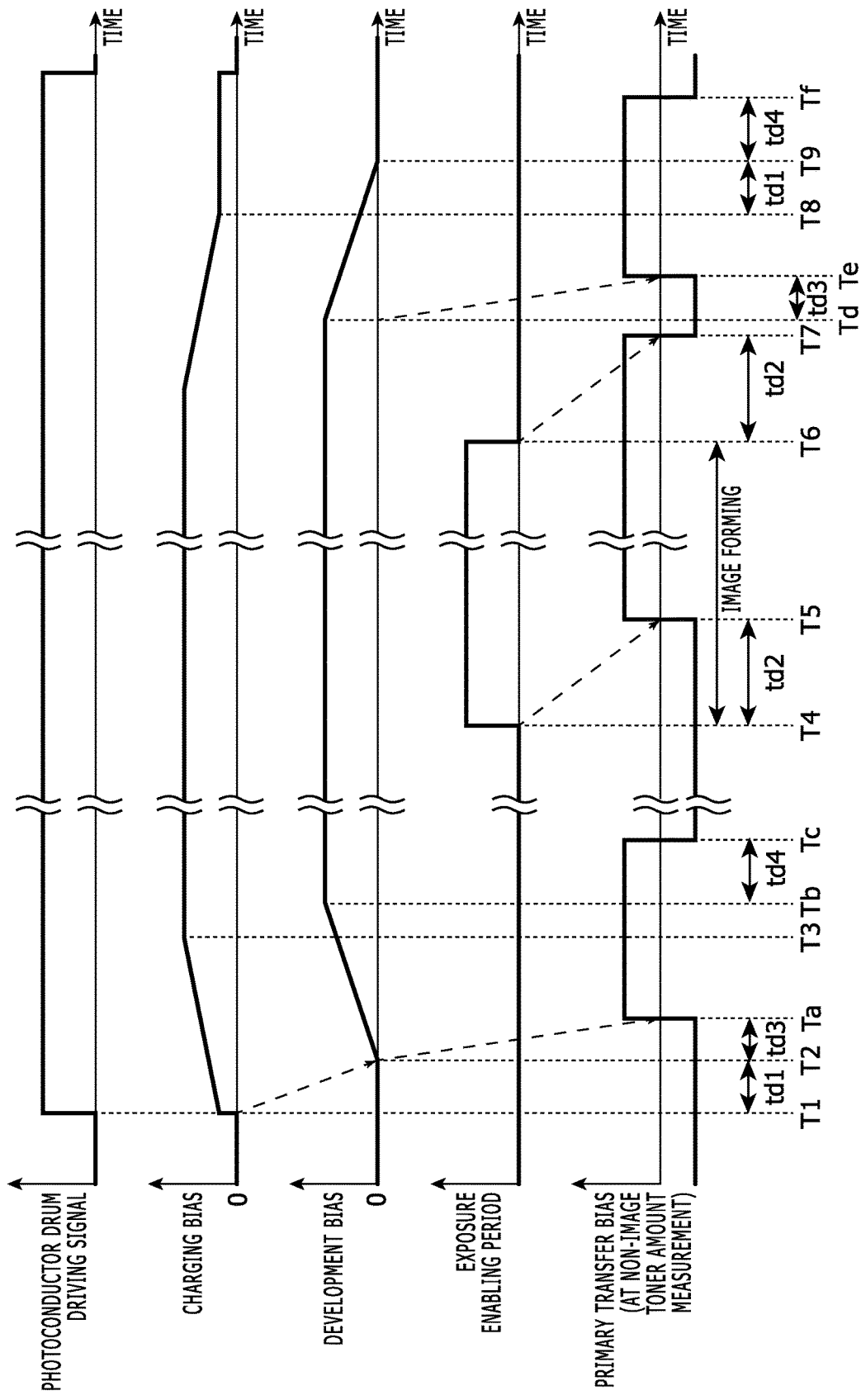
FIG. 4 shows a timingchart that explains a behavior of the image forming apparatus shown in FIGS. 1 to 3.

The following part explains a behavior of the aforementioned image forming apparatus. FIG. 4 shows a timingchart that explains a behavior of the image forming apparatus shown in FIGS. 1 to 3.

(a) Measurement of a Non-Image Toner Amount

When detecting an image forming request for a printing job, a calibration or the like, the non-image toner amount determining unit 41 determines whether the primary transfer of the non-image toner and the determination of the non-image toner amount should be performed or not in accordance with a predetermined condition.

If it is determined that the primary transfer of the non-image toner and the determination of the non-image toner amount should be performed, then the non-image toner amount determining unit 41 controls the primary transfer bias as shown in FIG. 4.

Specifically, from the time Ta to the time Tc, the non-image toner amount determining unit 41 applies the primary transfer bias corresponding to increase the charging bias and the development bias before image forming. Here, the time Ta is a time point with a delay td3 from starting of the increase of the development bias (the time T2), and the time Tc is a time point with a predetermined delay td4 (td4 is equal to or longer than td3) from ending of the increase of the development bias (the time Tb). Here, the delay td3 is obtained by dividing an angle difference between the development roller 14 and the primary transfer position (specifically, an angle from a position with the shortest distance between the development roller 14 and the photoconductor drum 1a (1b, 1c, or 1d) to a position with the shortest distance between the primary transfer roller 23 and the photoconductor drum 1a (1b, 1c, or 1d) when a center shaft of the photoconductor drum 1a (1b, 1c, or 1d) is considered as the center) by a rotation speed of the photoconductor drum 1a (1b, 1c, or 1d).

Further, from the time Te to the time Tf, the non-image toner amount determining unit 41 applies the primary transfer bias corresponding to decrease the charging bias and the development bias after image forming. Here, the time Te is a time point with a delay td3 from starting of the decrease of the development bias (the time Td), and the time Tf is a time point with a predetermined delay td4 (td4 is equal to or longer than td3) from ending of the decrease of the development bias (the time T9).

As mentioned, the non-image toner amount determining unit 41 controls the primary transfer bias, and consequently, non-image toner attached to the photoconductor drum 1a (1b, 1c, or 1d) in the increase of the charging bias and the development bias is transferred to the intermediate transfer belt 4, and the non-image toner is detected by the sensor 8. On the basis of an output of the sensor 8, the non-image toner amount determining unit 41 determines the non-image toner attached to the photoconductor drum 1a (1b, 1c, or 1d) in the increase of the charging bias and the development bias.

Similarly, the non-image toner amount determining unit 41 controls the primary transfer bias as mentioned, and consequently, non-image toner attached to the photoconductor drum 1a (1b, 1c, or 1d) in the decrease of the charging bias and the development bias is transferred to the intermediate transfer belt 4, and the non-image toner is detected by the sensor 8. On the basis of an output of the sensor 8, the non-image toner amount determining unit 41 determines the non-image toner attached to the photoconductor drum 1a (1b, 1c, or 1d) in the decrease of the charging bias and the development bias.

The non-image toner amount determining unit 41 determines in the aforementioned manner and stores the non-image toner amount in the increase of the charging bias and the development bias and the non-image toner amount in the decrease of the charging bias and the development bias in an unshown non-volatile storage device (e.g. flash memory or the like), and updates non-image toner amounts stored in the storage device with the determined non-image toner amounts. Here, the non-image toner amount determining unit 41 may independently store the non-image toner amount in the increase of the charging bias and the development bias and the non-image toner amount in the decrease of the charging bias and the development bias in an unshown non-volatile storage device, and may store in an unshown non-volatile storage device a sum of: (a) the non-image toner amount in the increase of the charging bias and the development bias and (b) the non-image toner amount in the decrease of the charging bias and the development bias.

As mentioned, for example, when detecting an image forming request for a printing job, a calibration or the like, the non-image toner amount determining unit 41 determines whether the primary transfer of the non-image toner and the determination of the non-image toner amount should be performed or not in accordance with a predetermined condition.

Figure 5:
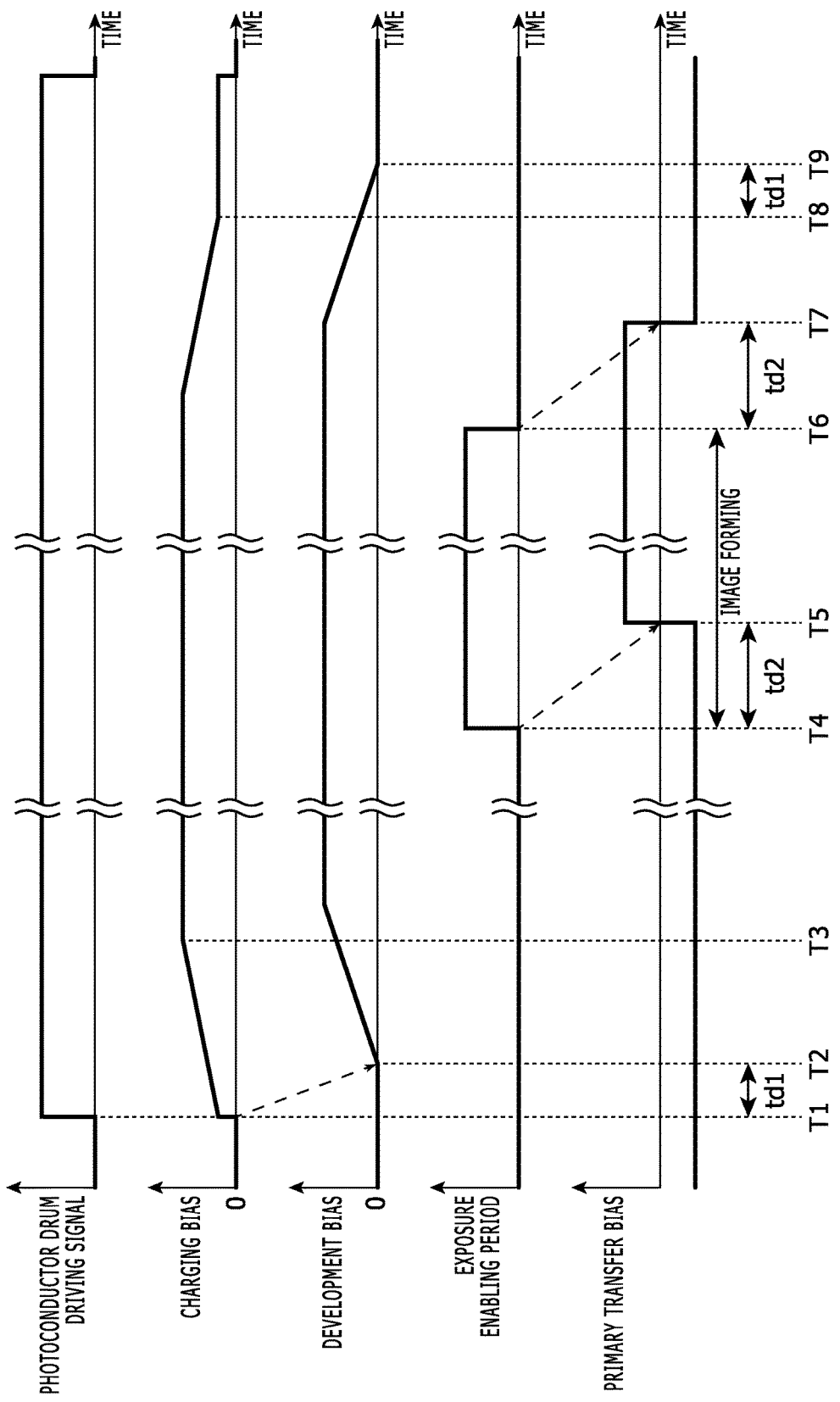
FIG. 5 shows a timingchart that explains a behavior of an image forming apparatus in an image forming process.

If it is determined that the primary transfer of the non-image toner and the determination of the non-image toner amount should not be performed, then the non-image toner amount determining unit 41 controls the primary transfer bias as shown in FIG. 5. In such a case, the non-image toner is not transferred to the intermediate transfer belt 4 and is collected by the cleaning device 22 (here, the cleaning blade 22a).

(b) Determination of a Toner Consumption Amount or a Toner Residual Amount

Every time that image forming is performed, the toner amount managing unit 42 determines a toner usage amount of an image area, and adds the determined toner usage amount to a toner consumption amount, and adds the non-image toner amount (a sum of the non-image toner amount in the increase of the charging bias and the development bias before image forming and the non-image toner amount in the decrease of the charging bias and the development bias after image forming) to the toner consumption amount. Further, when requested, the toner amount managing unit 42, for example, displays the current toner consumption amount and/or the current toner residual amount on an unshown display device.

As mentioned, in this embodiment, the non-image toner amount determining unit 41 (a) primarily transfers to the intermediate transfer belt 4 non-image toner attached on the photoconductor drum 1*a*, 1*b*, 1*c*, or 1*d* while the charging bias and the development bias are increased before image forming and/or while the charging bias and the development bias are decreased after image forming, and (b) determines an amount of the non-image toner on the basis of an output of the sensor 8. The toner amount managing unit 42 determines a toner consumption amount or a toner residual amount with taking the determined amount of the non-image toner into account.

Consequently, actual non-image toner attached to the photoconductor drum 1*a*, 1*b*, 1*c*, or 1*d* due to toner fog is measured and therefore a toner consumption amount and a toner residual amount including the toner usage amount due to toner fog are properly determined.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the intermediate transfer belt 4 is used as the intermediate transfer member. Alternatively, an intermediate transfer drum may be used as the intermediate transfer member. In such a case, the non-image toner is also detected by a sensor similar to the sensor 8.

Further, in the aforementioned embodiment, the non-image toner amount determining unit 41 determines the non-image toner amount of each toner color, and the toner amount managing unit 42 determines the toner consumption amount or the toner residual amount of each toner color.

Furthermore, the non-image toner amount determining unit 41 detects the non-image toner amounts both of in the increase and in the decrease of the charging bias and the development bias. Alternatively, the non-image toner amount determining unit 41 may detect the non-image toner amount only either one of in the increase and in the decrease of the charging bias and the development bias. In such a case, the toner amount managing unit 42 may (a) assume that the non-image toner amount in the increase of the charging bias and the development bias and the non-image toner amount in the decrease of the charging bias and the development bias are equal to each other and (b) estimate one of the non-image toner amount in the increase of the charging bias and the development bias and the non-image toner amount in the decrease of the charging bias and the development bias from the other.

What is claimed is:

1. An image forming apparatus, comprising:
   a photoconductor drum;
   an exposure device configured to irradiate the photoconductor drum with light and thereby form an electrostatic latent image;
   a charging device configured to charge the photoconductor drum with a charging bias;
   a development roller configured to hold toner with a development bias and attach the toner to the electrostatic latent image;
   an intermediate transfer member onto which a toner image is primarily transferred, the toner image obtained by attaching the toner to the electrostatic latent image;
   a sensor configured to detect the toner on the intermediate transfer member;
   a determining unit configured to primarily transfer to the intermediate transfer member non-image toner attached on the photoconductor drum while the charging bias and the development bias are increased before image forming and/or while the charging bias and the development bias are decreased after image forming, and determine an amount of the non-image toner on the basis of an output of the sensor; and
   a managing unit configured to determine a toner consumption amount or a toner residual amount with taking the determined amount of the non-image toner into account.

2. The image forming apparatus according to claim 1, wherein the determining unit determines a total amount of the non-image toner on the basis of (a) the determined amount of the non-image toner and (b) the number of times of (b1) increase of the charging bias and the development bias before image forming and/or (b2) decrease of the charging bias and the development bias before image forming; and
   the managing unit determines a toner consumption amount or a toner residual amount with taking the determined total amount into account.

3. The image forming apparatus according to claim 1, wherein the determining unit determines the amount of the non-image toner on the basis of (a) a density and (b) a length in a secondary scanning direction of the non-image toner detected by the sensor.

* * * * *